United States Patent [19]

Darden et al.

[11] Patent Number: 4,592,853

[45] Date of Patent: Jun. 3, 1986

[54] DICYCLOPENTADIENE DICARBOXYLIC ACID SALTS AS CORROSION INHIBITORS

[75] Inventors: Jerome W. Darden; Edward E. McEntire, both of Austin, Tex.

[73] Assignee: Texaco Inc., White Plains, N.Y.

[21] Appl. No.: 731,821

[22] Filed: May 8, 1985

[51] Int. Cl.4 ................................................ C09K 5/00
[52] U.S. Cl. ........................................ 252/75; 252/76; 252/77; 252/79; 252/396
[58] Field of Search ...................... 252/75, 76, 77, 79, 252/396; 562/488

[56] References Cited

U.S. PATENT DOCUMENTS

| | | | |
|---|---|---|---|
| 2,726,215 | 12/1955 | Jones | 252/76 |
| 3,931,029 | 1/1976 | Dutton et al. | 252/76 |
| 4,382,008 | 5/1983 | Boreland et al. | 252/75 |
| 4,402,847 | 9/1983 | Wilson et al. | 252/75 |
| 4,414,126 | 11/1983 | Wilson | 252/78.1 |

*Primary Examiner*—Paul Lieberman
*Assistant Examiner*—Robert A. Wax
*Attorney, Agent, or Firm*—Jack H. Park; Kenneth R. Priem; Richard A. Morgan

[57] ABSTRACT

A corrosion inhibited antifreeze composition incorporating a corrosion inhibitor is described. Six dibasic salts of dicyclopentadiene dicarboxylic acid and optionally a triazole comprise the corrosion inhibitor.

14 Claims, No Drawings

DICYCLOPENTADIENE DICARBOXYLIC ACID SALTS AS CORROSION INHIBITORS

BACKGROUND OF THE INVENTION

1. Field of the Invention

The invention relates to corrosion-inhibited aqueous solutions and particularly relates to corrosion-inhibited antifreeze compositions containing dicyclopentadiene dicarboxylic acid salts useful as coolants such as in the cooling system of an internal combustion engine.

2. Other Inhibitors Known in the Art

It is well known to use dicarboxylic acids as corrosion inhibitors in aqueous systems. For example, Jones in U.S. Pat. No. 2,726,215 teaches that dicarboxylic acids; namely sebacic acid and azelaic acid, and their alkali and alkali metal salts are useful corrosion inhibitors in aqueous solutions. The use of a mixture of sodium sebacate (sodium salt of sebacic acid) and benzotriazole was disclosed as a useful corrosion inhibitor in engine coolants by G. Butler, et al. in "Inhibitor Formulations for Engine Coolants," British Corrosion Journal, Vol. 12, No. 3, 1977, pp 171–174.

U.S. Pat. No. 3,931,029 to Dutton, et al. teaches the use of certain unsaturated cycloalkylene dicarboxylic acids as antifreeze additives to inhibit corrosion of contacted solder alloys. Corrosion inhibitors containing an imidazoline derivative, a carboxylic acid or its metal salt and/or a phosphate are used for steel in brackish or acidic water according to Chemical Abstracts, Vol. 99, paragraph 126713x, 1983, which describes Japanese Kokai 58-84,981. U.S. Pat. No. 4,382,008 reveals a corrosion-inhibited antifreeze containing a triazole, an alkali metal borate, an alkali metal benzoate, an alkali metal silicate and an alkali metal salt of a $C_7$ to $C_{13}$ dibasic organic acid. The use of sodium sebacate as a corrosion inhibitor in phosphate-based antifreezes is further seen in the Derwent Abstract of Week E14 for French Certificate of Utility 2,489,355 to Perrot.

The Derwent Abstract of Week K18 for European Pat. No. 77,767-B teaches the use of water-soluble salts of dicarboxylic acids having at least three carbon atoms as antifreeze corrosion inhibitors. These acids are malonic, succinic, glutaric and adipic acids along with smaller proportions of $C_8$ and/or $C_{10}$ dicarboxylic acids. A mixture of a siloxane-silicate copolymer with an azole was found effective in reducing the corrosion of high-lead solder and aluminum in aqueous liquids according to U.S. Pat. Nos. 4,402,847 to Wilson, et al. 4,414,126 also to Wilson involves the use of alkali metal mercaptobenzothiazoles as effective inhibitors for the corrosion of high lead solder in aqueous systems.

U.S. Pat. No. 4,454,050 to Bertell teaches the use of the alkali metal salts of naphthalene dicarboxylic acids to prevent sticking and staining of castings when in contact with a dye.

U.S. application Ser. No. 06/672,736 filed Nov. 19, 1984, discusses other dicarboxylic acid containing corrosion inhibiting compositions.

SUMMARY OF THE INVENTION

The invention concerns a corrosion inhibited antifreeze composition having a water soluble liquid alcohol freezing point depressant and an effective amount of an inhibitor. The inhibitor is a selected dibasic acid salt of dicyclopentadiene dicarboxylic acid and optionally a triazole component.

DETAILED DESCRIPTION OF PREFERRED EMBODIMENTS

It has been surprisingly discovered that a corrosion inhibiting composition having a dicarboxylic acid disalt component and optionally a triazole component can be made from plentiful and inexpensive raw materials. These corrosion inhibitors are particularly effective in antifreeze formulations for automobile cooling systems, when used in an effective amount of about 0.1 to 6 wt. %.

The antifreeze formulations most commonly used include mixtures of water and water-soluble liquid alcohol freezing point depressants such as glycols and glycol ethers. The glycols and glycol ethers which can be employed as major components in the present composition include glycols such as ethylene glycol, diethylene glycol, propylene glycol, and dipropylene glycol, and glycol monoethers such as the methyl, ethyl, propyl and butyl ether of ethylene glycol, diethylene glycol, propylene glycol and dipropylene glycol. Also useful are glycol diethers such as methyl and ethyl diethers of ethylene glycol, diethylene glycol and dipropylene glycol. Ethylene glycol is particularly preferred as the major antifreeze component.

Dicyclopentadiene dicarboxylic acid of the present invention may be synthesized by reacting commercially available dicyclopentadiene with synthesis gas in the presence of carbonylation catalyst to form the diester. The diester is then hydrolyzed to form dicyclopentane dicarboxylic acid.

The compounds produced are susceptible of more than one name. The compounds will be named herein as derivatives of indene according to the structure:

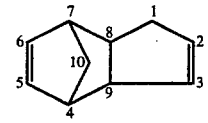

Based on this numbering system the eight possible dicarboxylic acids would be called 4,7-Methanoindenedicarboxylic acid, hexahydro- [Chemical Abstracts 53:P1190b].

However; by the synthesis described herein only six isomers are produced and two excluded. Those produced are:

hexahydro-4,7-Methanoindene-1,5-dicarboxylic acid,
hexahydro-4,7-Methanoindene-1,6-dicarboxylic acid,
hexahydro-4,7-Methanoindene-3,5-dicarboxylic acid,
hexahydro-4,7-Methanoindene-3,6-dicarboxylic acid,
hexahydro-4,7-Methanoindene-2,5-dicarboxylic acid,
hexahydro-4,7-Methanoindene-2,6-dicarboxylic acid.

The 2,5 and 2,6 dicarboxylic acids are functionally identical. The 1,5 and 3,6 dicarboxylic acids are functionally identical. And, the 1,6 and 3,5 dicarboxylic acids are functionally identical. The salts of these six compounds are the only ones which demonstrate anti-corrosive activity.

The salts of 2,3 and 5,6-dicarboxylic acid are not effective because they form metal chelates, thereby promoting degradation of the metal surface.

The alkali metal salts are formed by reacting the dicarboxylic acid with alkali metal hydroxides (e.g. sodium, potassium or lithium hydroxide) in water in equivalent proportions to neutralize the carboxylic acid groups. The amine salts are formed by reacting the dicarboxylic acid with a tertiary amine; preferably triethanolamine, in water in equivalent proportions to neutralize the carboxylic acid groups. A pH of 7 to 8 indicates that all of the carboxyl groups have been neutralized and that neither free acid nor excessive free base remains to cause corrosion, odor or handling difficulties. The salt is incorporated in the antifreeze concentrate at a final pH of 6.5 to 9.0.

It has been found that the identified dicarboxylic acid salts are effective in inhibiting corrosion in antifreeze compositions when incorporated in an amount of 2 to 6 wt % and optionally with a triazole in an amount of 0.1 to 1.0 wt %, e.g. Example 3. Alkali metal mercaptothiazoles and alkali metal tolyltriazoles and alkali metal benzotriazoles may be used, e.g. sodium mercaptobenzothiazole. Benzotriazole and tolyltriazole are especially preferred.

Additionally other conventional corrosion inhibiting compounds may be incorporated and the amount of dicyclopentadiene dicarboxylic diacid salt reduced to as low as 0.1 wt %, e.g. Example 4. These conventional corrosion inhibiting compounds include alkali metal silicates (e.g. sodium metasilicate, potassium metasilicate, lithium metasilicate and preferably sodium metasilicatepentahydrate); amines; nitrites; nitrates; chromates, borates and phosphates. Other corrosion inhibitors and additives which may be used are benzoates (alkali metal benzoates), molybdates (alkali metal molybdates), various antifoaming agents and dyes. Additionally, stabilizers may be added; such as polysiloxane stabilizers to prevent alkali metal silicate-caused gellation problems.

When used in an amount of 0.1 to 1.0 wt % in conjunction with conventional corrosion inhibitors, the dicarboxylic acid salts are cast iron corrosion inhibitors.

The invention will be further illustrated by the following examples which are not intended to limit but rather to illuminate the invention.

EXAMPLE 1

An antifreeze of the following composition was prepared:

|  | Wt. % |
| --- | --- |
| Ethylene glycol | 93.9 |
| NaOH, 50% aq. | 2.4 |
| Acid* | 3.5 |
| Tolyltriazole | 0.2 |

*Commercially available acid: 4,7-Methanoindene-2,5-dicarboxylic acid hexahydro- The pH of 33% antifreeze solution in water was 7.2. The sodium disalt was formed in the glycol-water solution as indicated by the pH.

This sample was diluted to 25% antifreeze concentrate with ASTM corrosive water and tested in the ASTM D-1384 Glassware Corrosion Test. Results were as follows:

| ASTM D-1384 Glassware Test (25%) Weight loss, mg/coupon | | | | | |
| --- | --- | --- | --- | --- | --- |
| Cu | 70/30 Solder | Brass | Steel | Fe | Al |
| 3 | 0 | 3 | 0 | −1 (gain) | 10 |
| ASTM spec, max 10 | 30 | 10 | 10 | 10 | 30 |

EXAMPLE 2

An antifreeze with the following composition was prepared:

|  | Wt. % |
| --- | --- |
| Ethylene glycol | 93.4 |
| NaOH, 50% aq. | 2.7 |
| DCPDA-6 isomers | 3.9 |

DCPDA-6 isomers: 4,7-Methanoindene dicarboxylic, hexahydromixture of 1,5; 1,6; 3,5; 3,6; 2,5 and 2,6 dicarboxylic acids.

The pH of a 33% antifreeze solution in water was 7.5.

the antifreeze concentrate was diluted to 25% with ASTM corrosive water and tested in the ASTM D-1384 Glassware Corrosion Test. Results are given below:

| ASTM D-1384 Glassware Corrosion Test | | | | | |
| --- | --- | --- | --- | --- | --- |
| Wt. loss, mg/coupon | | | | | |
| Cu | Solder | Brass | Steel | Fe | Al |
| 3 | 0 | 1 | 0 | 1 | 6 |
| ASTM spec, max. 10 | 30 | 10 | 10 | 10 | 30 |

These results are comparable to those obtained in Example 1, where tolyltriazole was added to the formation. Triazoles are generally used to prevent copper and brass corrosion. The formulations of this example of good protection for these metals without the use of triazoles which are generally very expensive.

EXAMPLE 3

An antifreeze of the following composition was prepared:

|  | Wt. % |
| --- | --- |
| Ethylene glycol | 93.2 |
| NaOH, 50% aq. | 2.7 |
| DCPDA-6 isomers | 3.9 |
| Tolyltriazole | 0.2 |

The pH of a 33% antifreeze solution in water was 7.3.

The antifreeze concentrate prepared above was tested in both the ASTM D-1384 Glassware Test and the ASTM D-4340 Aluminum Heat Rejecting Test. The Heat Rejecting Test gives a measure of the protection imparted by the antifreeze at aluminum heat rejecting surfaces such as cylinder heads. It is run at a higher temperature and under pressure; therefore in some ways it is a more severe test for aluminum than is the Glassware Test. Results were as follows:

| ASTM D-4340 Heat Rejecting Test wt. loss, mg/cm²/wk | |
| --- | --- |
| Formulation of Example 3 | 0.11 |
| ASTM Spec, Max | 1.0 |

This antifreeze performs far better than required by the specification.

| ASTM D-1384 Glassware Test Wt. Loss, mg/coupon | | | | | |
| --- | --- | --- | --- | --- | --- |
| Cu | Solder | Brass | Steel | Fe | Al |
| 0 | 1 | 2 | −2 | −2 | 1 |

| ASTM D-1384 Glassware Test Wt. Loss, mg/coupon | | | | | |
|---|---|---|---|---|---|
| Cu | Solder | Brass | Steel | Fe | Al |
|  |  |  |  | (gain) | (gain) |

In addition to its usefulness as the sole corrosion inhibitor in an antifreeze, select DCPDA disalts may be used as substitutes for sodium nitrite as inhibitors for cast iron corrosion. Nitrites are suspected of forming toxic nitrosoamines when contacted with amine based antifreezes. The use of nitrites is being prohibited by major automakers. There remains a need for effective inhibitors of cast iron corrosion, however. Results obtained by using select DCPDA disalts as a nitrite substitute in a conventional antifreeze formulation are given below.

EXAMPLE 4

An antifreeze containing ethylene glycol, sodium tetraborate, NaOH, sodium nitrate, sodium benzoate, sodium metasilicate, tolyltriazole, and dicyclopentadiene dicarboxylic acid was diluted to 25% and tested in the ASTM D-1384 Glassware Test. The cast iron coupon in the test showed a weight loss of 5 mg/coupon; the ASTM specification calls for a maximum loss of 10 mg/coupon.

The same antifreeze formulation containing sodium nitrite was tested; the iron coupon showed a weight loss of 2 mg/coupon. Thus, six DCPDA disalts are a satisfactory substitute for nitrite. When nitrite was left out of the formulation, the iron coupon gave a weight loss of 69 mg/coupon.

The examples are for illustrative purposes and not meant to limit the invention in any way. Variations and modifications of the above are possible without exceeding the scope of the present invention. For example, the corrosion inhibited composition described herein is a concentrate. This concentrate is diluted with 40 to 60 vol % water; preferably 50 vol % water when used in automotive cooling systems. In practice, this dilution is not monitored and the diluted compositions of the present invention are designed to be non-corrosive and effective up to a water concentration of 75 vol % or more. It is understood that water dilutions are equivalent to the concentrated compostions set forth in the following claims:

What is claimed is:

1. A corrosion inhibited antifreeze composition comprising a water-soluble liquid alcohol freezing point depressant and an effective amount of an inhibitor comprising:
    a dibasic acid salt selected from the group consisting of the alkali metal salts of:
    hexahydro-4,7-Methanoindene-1,5-dicarboxylic acid,
    hexahydro-4,7-Methanoindene-1,6-dicarboxylic acid,
    hexahydro-4,7-Methanoindene-3,5-dicarboxylic acid,
    hexahydro-4,7-Methanoindene-3,6-dicarboxylic acid,
    hexahydro-4,7-Methanoindene-2,5-dicarboxylic acid,
    hexahydro-4,7-Methanoindene-2,6-dicarboxylic acid and mixtures thereof.

2. The composition of claim 1 which additionally comprises a triazole.

3. The composition of claim 2 wherein the dibasic acid salt is in an amount of 2 to 6 wt % and the triazole is in an amount of 0.1 to 1.0 wt %.

4. The composition of claim 1 wherein the alkali metal is selected from the group consisting of sodium, potassium and lithium.

5. The composition of claim 2 wherein the triazole is selected from the group consisting of tolyltriazole, benzotriazole and sodium mercaptobenzothiazole.

6. The composition of claim 1 wherein the liquid alcohol freezing point depressant is ethylene glycol.

7. The composition of claim 1 which additionally comprises water.

8. A corrosion inhibited antifreeze composition comprising a water soluble liquid alcohol freezing point depressant and an effective amount of an inhibitor comprising:
    a dibasic acid salt selected from the group consisting of the amine salts of:
    hexahydro-4,7-Methanoindene-1,5-dicarboxylic acid,
    hexahydro-4,7-Methanoindene-1,6-dicarboxylic acid,
    hexahydro-4,7-Methanoindene-3,5-dicarboxylic acid,
    hexahydro-4,7-Methanoindene-3,6-dicarboxylic acid,
    hexahydro-4,7-Methanoindene-2,5-dicarboxylic acid,
    hexahydro-4,7-Methanoindene-2,6-dicarboxylic acid and mixtures thereof.

9. The composition of claim 8 which additionally comprises a triazole.

10. The composition of claim 9 wherein the dibasic acid salt is in an amount of 2 to 6 wt % and the triazole is in an amount of 0.1 to 1.0 wt %.

11. The composition of claim 8 wherein the amine is triethanolamine.

12. The composition of claim 9 wherein the triazole is selected from the group consisting of tolyltriazole, benzotriazole and sodium mercaptobenzothiazole.

13. The composition of claim 8 wherein the liquid alcohol freezing point depressant is ethylene glycol.

14. The composition of claim 8 which additionally comprises water.

* * * * *